United States Patent [19]

Tate

[11] Patent Number: 5,177,873
[45] Date of Patent: Jan. 12, 1993

[54] ADJUSTABLE PLUMB LEVEL

[76] Inventor: Edwin M. Tate, 3801 S. Quail La., Chattanooga, Tenn. 37415

[21] Appl. No.: 861,584

[22] Filed: Apr. 1, 1992

Related U.S. Application Data

[63] Continuation-in-part of Ser. No. 765,831, Sep. 26, 1991, Pat. No. 5,111,589.

[51] Int. Cl.⁵ ............................................. G01C 9/28
[52] U.S. Cl. ...................................................... 33/385
[58] Field of Search ................. 33/387, 388, 384, 389, 33/385, 383

[56]  References Cited

U.S. PATENT DOCUMENTS

| | | |
|---|---|---|
| 288,624 | 11/1883 | Davis . |
| 516,024 | 3/1894 | Schaefer . |
| 908,406 | 12/1908 | Henderson . |
| 935,807 | 10/1909 | Oswald ............................ 33/387 X |
| 970,729 | 9/1910 | Lingle ................................ 33/383 |
| 1,215,035 | 2/1917 | Kocisko ............................. 33/387 |
| 1,380,611 | 6/1921 | Walker . |
| 1,703,006 | 2/1929 | Jay . |
| 1,765,060 | 6/1930 | De Angelis . |
| 1,815,949 | 7/1931 | Marischal . |
| 2,102,364 | 12/1937 | Langsner . |
| 2,692,440 | 10/1954 | Walters ............................. 33/383 |
| 4,335,524 | 6/1982 | Schimming . |
| 4,876,798 | 10/1989 | Zimmerman . |
| 4,979,310 | 12/1990 | Wright . |

FOREIGN PATENT DOCUMENTS 771735  4/1957  United Kingdom .

Primary Examiner—Harry N. Haroian
Attorney, Agent, or Firm—Cushman, Darby & Cushman

[57]  ABSTRACT

An adjustable plumb level having a first gear driven by a second gear. The second gear has a smaller external diameter than does said first gear. The second gear is operatively coupled to first gear so that when an external force causes the second gear to rotate, the first gear also rotates. The first gear includes a straight vial disposed in the center thereof.

14 Claims, 2 Drawing Sheets

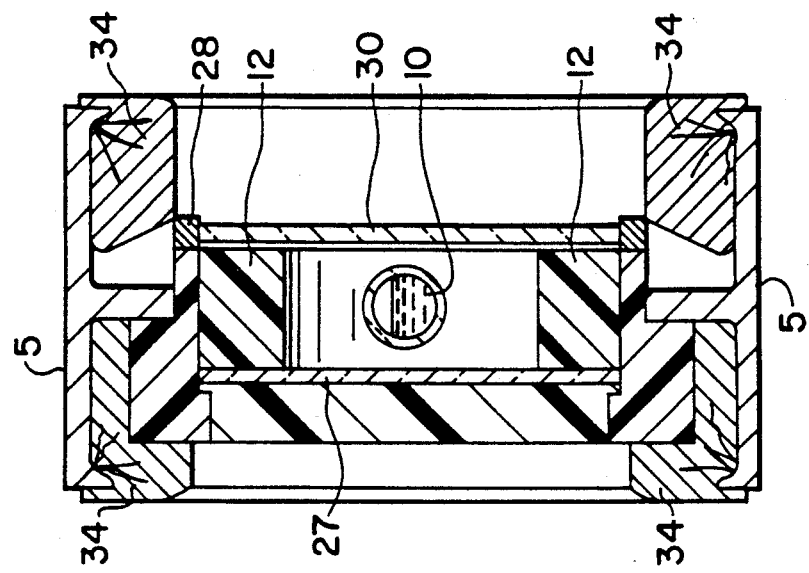
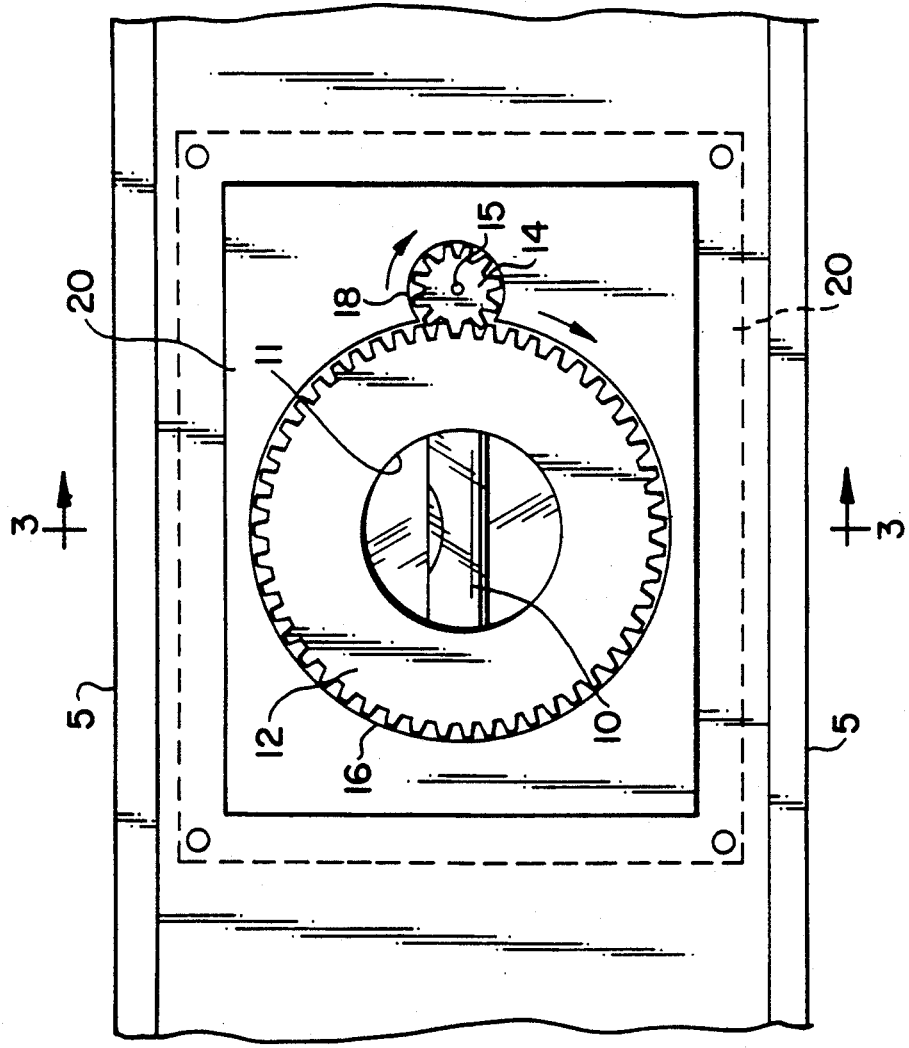

5,177,873

ADJUSTABLE PLUMB LEVEL

CROSS REFERENCE TO RELATED APPLICATIONS

This application is a continuation-in-part of application number 07/765,831, filed Sep. 26, 1991 and issued on May 12, 1992 as U.S. Pat. No. 5,111,589.

BACKGROUND OF THE INVENTION

1. Field of the Invention

The present invention relates to levels for use in masonry, carpentry or in many other fields, such as architecture and interior design. More particularly, the present invention is directed toward an adjustable plumb level having a 360° rotational, replaceable leveling mechanism.

2. Description of the Related Art

Adjustable levels have been known for a considerable time, but these levels lacked the necessary versatility to be used for long periods of time as either a plumb or a level. This required that the person using both levels and plumbs have more than just a single piece of equipment, and replace this equipment at fairly regular intervals.

For example, Clarke in British Pat. No. 771,735 teaches a level with a 360° rotatable vial. Grooves L are provided on sleeve B in which the vial is mounted. The vial A is held in position by a catch, which includes a slide M movable by a spring N. The slide engages the grooves provided on the sleeve. Vial A is positioned in a desired position by way of the user setting the vial in the desired position after moving the slide backwards so as to release it from the groove in which it is set. The slide M moves by way of "finger pressure". Thus, the accuracy of this device is compromised as the user has to carry out the positioning process by actually moving the vial and slide with his or her hands.

Many levels have been disclosed where the vial may be tipped slightly in order to level the vial. However, as these models, such as those disclosed in U.S. Pat. No. 1,703,006 to Jay and U.S Pat. No. 516,024 to Schaefer, only move the vial several degrees, it is impossible to use the level when large variations from horizontal must be accounted for.

Due to the inherent inaccuracies of levels and plumbs, it is not uncommon for buildings to be built slightly askew. Minor errors in construction will force the next person that builds an adjacent or above structure to build the adjacent structure also at a slight tip to compensate for the skew in the first building or part. Thus, it is desirable to have an adjustable level that can be calibrated for perfect level or plumb and can be used in either a vertical or a horizontal position, i.e. as either a plumb or a level, without requiring the use of a great number of parts.

SUMMARY OF THE INVENTION

The present invention provides an adjustable plumb level with the number of moving parts minimized. The plumb level according to the present invention includes means for adjusting the level and means for allowing replacement of the vial should the original become damaged. The present invention may be used as either a plumb or a level. The vial mounted in the plumb/level may be rotated 360° by the interaction of two gears. The first or inner gear has the vial mounted in an interior opening. Gear teeth are present on the exterior lateral surface or the first gear. These teeth are operatively coupled with teeth of a second or drive gear, which is smaller and the motion of which rotates the inner gear. The second gear is rotated by external means, such as an Allen head wrench sized to fit an receptive opening in the center of the second gear.

Further, the present invention allows for great accuracy in positioning the vial, as human hands do not have to be relied upon to rotate the vial or release a vial holding means. Because of the size difference between the first and second gears, rapid turns of the second gear slowly turn the first gear.

Further, the present invention can be rapidly repaired. If a vial should become damaged, the first gear can simply be replaced with a new gear that fits the hole left after the damaged gear is removed.

The present invention is directed at an adjustable plumb level that includes an I-shaped beam having first and second opposite, flat sides, with the I beam having an opening extending from the first to the second side. A receiver member is coupled to the I beam and extends at least partially through the opening. The receiver member has a first annular wall that defines a first space and a second annular wall that defines a second space. The first space is connected to the second space via a break in the first annular wall.

A first gear means is disposed in the first space, wherein the first gear means is annular in form and has a level indicating mechanism disposed in a center thereof. A second gear means operatively coupled to the first gear means is provided, and the second gear means has a smaller outer diameter than an outer diameter of the first gear means.

An external force is applied to a means for operatively coupling disposed on the second gear means, and the force is operatively coupled to the first gear means. The plumb level further includes means for maintaining the first and second gear means in the first and second spaces, respectively. The indicating mechanism may be rotated to any angle.

The method for adjusting the plumb level according to the present invention includes the steps of providing an adjustable plumb level including an indicating mechanism disposed within a rotatable first gear and a second gear operatively coupled to the first gear for rotating the first gear in response to an external force. A means for supplying the external force to the second gear is engaged therewith. The means for supplying the external force supplies a force that causes the second gear to rotate. Thus, the first gear rotates in response to rotation of the second gear. The indicating mechanism is then levelled so as to indicate whether the plumb level is at the desired angle or not.

Other objects and features of the present invention will become apparent upon consideration of the following description and drawings. The methods of operation and the function of the related elements of structure will also become clear.

BRIEF DESCRIPTION OF THE DRAWING

The above-described objects of the present invention can be better appreciated by studying the following detailed description of the presently preferred embodiment together with the drawings in which:

FIG. 2 is a side view of the assembled plumb level without side panels; and

FIG. 3 is a sectional view along line III—III of FIG. 2, with the side panels shown on the device.

DETAILED DESCRIPTION OF THE PRESENTLY PREFERRED EXEMPLARY EMBODIMENT

Figure 1:
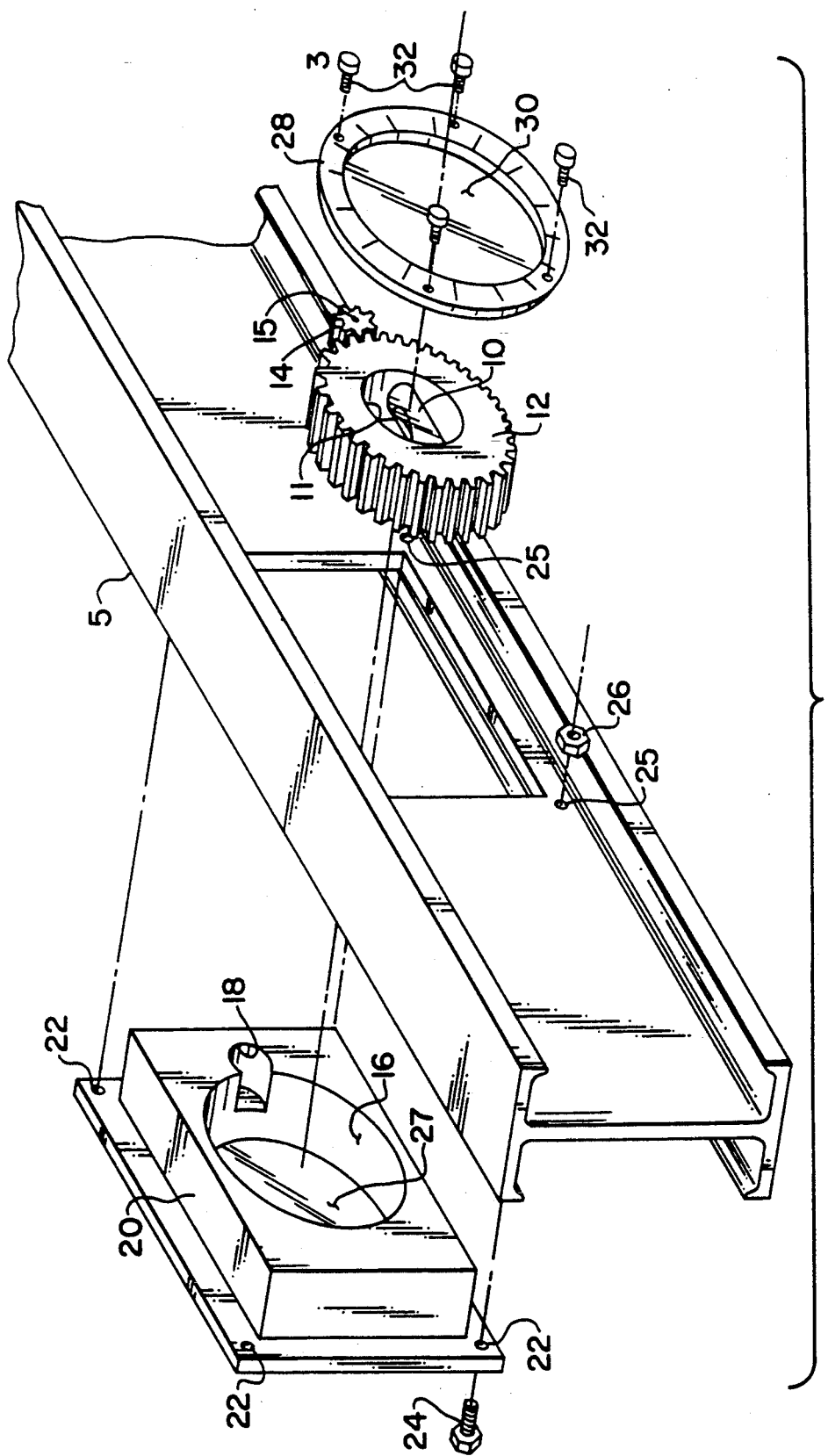
FIG. 1 is a view showing the present invention without side panels and the separate pieces disassembled from one another.

The present invention is shown in a disassembled state in FIG. 1. Straight vial 10 is rigidly mounted to inner annular surface 11 of first gear 12. Straight vial 10 is preferably fluid filled with an air bubble trapped therein for indicating when the plumb level is level. First gear 12 is preferably made of nylon, but other materials may also be used. First gear 14 is driven via rotation of second gear 14, which is preferably made of brass, but other materials will work. Second gear 14 includes an Allen head receiving opening 15 positioned in the center of a front end thereof. Second gear 14 is preferably sized about ¼ inch in outer diameter, while first gear 12 is about 1½ inches in outer diameter. Thus, the ratio of the circumference of the first gear to the circumference of the second gear is 6:1.

First gear 12 and second gear 14 fit into spaces formed in nylon receiver 20. First gear 12 fits into the space defined by the annular wall 16, while second gear 14 fits into the space defined by annular wall 18. Annular wall opens into annular wall 18, thus providing a gap through which the teeth of first gear 12 mesh with those of second gear 14. Nylon receiver 20 may be constructed of a different material, but nylon is preferable as it is light in weight and easily machined, and is mounted to aluminum I beam 5 via screws 24 and nuts 26. I beam 5 has an opening therein, the opening going from a first side of I beam 5 to a second side of I beam 5. Nylon receiver 20 is shaped so that a protruding portion, in which first gear 12 and second gear 14 are housed, fits through the opening in I beam 5, while a surrounding base of nylon receiver 20 abuts the first side of I beam 5. Screws 24 pass through holes 22 in nylon receiver 20 and through holes 25 in I beam 5 before nut 26 is joined with screw 24. First gear 12 is prevented from going completely through nylon receiver 20 by view glass 27, better shown in FIG. 3. Second gear 14 is held in position by meshing with first gear 12. Annular wall 18 may be tapered at one end so as hold second gear 14 in its proper position. Preferably, the space, which is defined by annular wall 18, provided for second gear 14 does not extend completely through the nylon receiver 20. Rather, the space defined by the annular wall 18 only extends as far into nylon receiver 20 as second gear 14 is deep. If is also possible that second gear 14 extend completely through nylon receiver 20 and that view glass 27 can cover the end of second gear 14 without the Allen head wrench receiving hole. View glass 27 is held in place by nylon receiver 20, as is shown in FIG. 3. However, view glass may be held in position by means other than the shape of the nylon receiver 20. For example, view glass 27 could be fastened to receiver 20 via screws, epoxy or other glues.

Retaining ring 28 is fastened to the face of nylon receiver 20 on a side opposite that on which view glass 27 is attached. Retaining ring 28 is fastened to receiver 20 by screws 32 that couple with the receiver 20. Retaining ring 28 preferably covers second gear 14's outer edge where it meshes with first gear 12. Thus, retaining ring 28 also serves to maintain second gear 14 in position. Transparent plate 30 is disposed within retaining ring 28. Transparent plate 30 is preferably made of glass, but may be made of plastic, such as LEXAN manufactured by the General Electric Corporation.

FIG. 2 is a side view of the assembled plumb/level. However, for clarity, the retaining ring 28 is not shown. All reference numbers used with respect to FIG. 1 remain the same in FIG. 2.

FIG. 2 clearly illustrates how first gear 12 and second gear 14 fit into the respective openings 16 and 18 formed in nylon receiver 20. Vial 10 is mounted in first gear 12. As mentioned above, vial 10 is preferably a straight vial. Second gear 14 includes a means for operatively coupling an external force to first gear 12. The external force is turned into rotation of the first gear 12. In the preferred embodiment, the means for operatively coupling the external force is Allen head wrench receiving space 15, formed in a face of second gear 14. Of course, other means of operatively coupling can be used. For example, the Allen hear wrench receiving space could be replaced with a screwdriver receptor. Further, a handle could be attached to second gear 14 that permits a user to turn the second gear by hand.

For precise measurements, a scale may be provided on view glass 27 or on retaining ring 28. Such a scale would allow a user to precisely position the vial at any desired degree of rotation.

FIG. 3 is a cross sectional view taken along line III-—III in FIG. 2. In FIG. 3, a wood veneer 34 is disposed on the sides of the plumb/level. Such a wood veneer can be made of mahogany or any other type of wood. The purpose of the wood veneer is at once functional and aesthetic. Besides making the present invention attractive, the wood veneer protects the nylon receiver 20 from being bumped, chipped or damaged.

The present invention has been described in connection with what is presently considered to be the most practical and preferred embodiment, but it is to be understood that the invention is not limited to the disclosed embodiment, but is intended to cover various arrangements and assorted modifications included within the spirit and scope of the appended claims.

What is claimed is:

1. An adjustable plumb level, comprising:
    an I-shaped structure having first and second opposite, flat sides, said I-shaped structure having an opening extending from said first to said second side;
    a receiver member coupled to said I-shaped structure and at least partially extending through said opening, said receiver member having a first annular wall defining a first space and a second annular wall defining a second space, said first space being connected to said second space via a break in the first annular wall;
    first gear means disposed in said first space, said first gear means being annular in form and having a level indicating mechanism disposed in the center thereof;
    second gear means disposed in said second space operatively coupled to said first gear means, said second gear means having a smaller outer diameter than an outer diameter of said first gear means;
    means for operatively coupling an external rotational force to said first gear means to change a position of said level indicating mechanism with respect to said I-shaped member, said operatively coupling means disposed on said second gear means; and means for maintaining the first and second gear means in said first and second spaces, respectively;

wherein said indicating mechanism is rotatable about 360° or any increment or multiple thereof.

2. An adjustable plumb level as claimed in claim 1, wherein said receiver member is constructed of nylon.

3. An adjustable plumb level as claimed in claim 1, further comprising protecting means disposed on said first and second sides of said I beam.

4. An adjustable plumb level as claimed in claim 3, wherein said protecting means are wood veneer panels.

5. An adjustable plumb level as claimed in claim 4, wherein said wood veneer panels are made of mahogany.

6. An adjustable plumb level as claimed in claim 1, wherein said first space extends completely through said receiver member.

7. An adjustable plumb level as claimed in claim 1, wherein said second space has a depth equal to a depth of said second gear means and less than a depth of said receiver member.

8. An adjustable plumb level as claimed in claim 1, wherein said indicating mechanism is a straight vial.

9. An adjustable plumb level as claimed in claim 1, wherein said first gear means is formed of nylon.

10. An adjustable plumb level as claimed in claim 1, wherein said second gear means is formed of brass.

11. An adjustable plumb level as claimed in claim 1, wherein a ratio of the outer diameter of said first gear means to the outer diameter of said second gear means is about 6:1.

12. An adjustable plumb level as claimed in claim 1, wherein said means for operatively coupling an external force to said first gear means includes an Allen head wrench socket.

13. An adjustable plumb level as claimed in claim 1, wherein said maintaining means comprises:
a lip on the receiver member disposed on said first annular wall on a side of said receiver member corresponding to said first side;
a view glass disposed on said receiver member on said side corresponding to said first side; and
a retaining ring disposed on said receiver member on a side corresponding to said second side.

14. An adjustable plumb level as claimed in claim 13, wherein said retaining ring includes a scale indicating degree of rotation for said first gear means.

* * * * *